US009909446B2

(12) United States Patent
Bynum

(10) Patent No.: US 9,909,446 B2
(45) Date of Patent: Mar. 6, 2018

(54) SELF-LOCKING PLUG

(71) Applicant: Kurt Kevin Bynum, Brighton, MI (US)

(72) Inventor: Kurt Kevin Bynum, Brighton, MI (US)

( * ) Notice: Subject to any disclaimer, the term of this patent is extended or adjusted under 35 U.S.C. 154(b) by 0 days.

(21) Appl. No.: 15/356,815

(22) Filed: Nov. 21, 2016

(65) Prior Publication Data

US 2017/0067361 A1 Mar. 9, 2017

Related U.S. Application Data

(63) Continuation-in-part of application No. 14/505,600, filed on Oct. 3, 2014, now Pat. No. 9,593,700.

(51) Int. Cl.

| | |
|---|---|
| *F01D 21/00* | (2006.01) |
| *F16L 19/00* | (2006.01) |
| *F16B 2/10* | (2006.01) |
| *G02B 23/24* | (2006.01) |

(52) U.S. Cl.
CPC .............. *F01D 21/003* (2013.01); *F16B 2/10* (2013.01); *G02B 23/2476* (2013.01); *F05D 2220/323* (2013.01); *F05D 2270/804* (2013.01); *F16L 19/005* (2013.01); *Y02T 50/671* (2013.01)

(58) Field of Classification Search
CPC .............. F16B 2/06; F16B 2/10; F01D 21/003
USPC .... 403/322.2, 320, 316, 315, 322.1; 285/82, 285/92, 87, 81, 89, 86
See application file for complete search history.

(56) References Cited

U.S. PATENT DOCUMENTS

| | | | | |
|---|---|---|---|---|
| 2,992,018 A | * | 7/1961 | Rosan ....................... | F16L 5/00 |
| | | | | 285/140.1 |
| 3,552,777 A | * | 1/1971 | Heinrich .................. | F16L 19/00 |
| | | | | 285/81 |
| 4,300,774 A | * | 11/1981 | Hollis ................... | F01D 21/003 |
| | | | | 277/630 |
| 4,552,427 A | * | 11/1985 | Landgreen ........... | H01R 13/622 |
| | | | | 285/87 |
| 4,599,019 A | * | 7/1986 | Ueberall ................. | B23B 31/38 |
| | | | | 192/56.57 |
| 4,815,276 A | * | 3/1989 | Hansel .................... | F01D 25/00 |
| | | | | 415/118 |
| 4,861,201 A | * | 8/1989 | Cuilleron ............ | B23B 31/1071 |
| | | | | 192/56.1 |
| 5,058,930 A | * | 10/1991 | Schlosser .............. | F16L 19/005 |
| | | | | 285/319 |

(Continued)

*Primary Examiner* — Joshua J Michener
*Assistant Examiner* — Kyle J. Walraed-Sullivan
(74) *Attorney, Agent, or Firm* — Peter J. Rashid

(57) ABSTRACT

A compact, highly-reusable, self-locking includes a body component, a flexible beam finger component with a plurality of axially-oriented flexible beam fingers and one or more outwardly extending tabs, an annular detent ring component including a plurality of detents in radial alignment with the plurality of flexible beam fingers, and a biasing component engaging the flange of the flexible beam finger component and the annular detent ring component for providing a biasing force to urge the flexible finger beam component in a direction of a central, longitudinal axis of the self-locking plug. The flexible beam finger component moves relative to the annular detent ring component when the body component is rotated about the central, longitudinal axis, A, of the self-locking plug, thereby causing the plurality of flexible beam fingers to travel across the plurality of detents and cause elastic deformation of the flexible beam fingers.

20 Claims, 17 Drawing Sheets

(56) References Cited

U.S. PATENT DOCUMENTS

| | | | | |
|---|---|---|---|---|
| 5,083,819 A * | 1/1992 | Bynum | ............... | F16L 19/005 285/315 |
| 5,115,636 A * | 5/1992 | Zeiser | ................ | F01D 21/003 415/118 |
| 5,215,336 A * | 6/1993 | Worthing | ............ | F16L 19/005 285/319 |
| 5,215,338 A | 6/1993 | Worthing | | |
| 5,362,110 A * | 11/1994 | Bynum | ................ | F16L 19/005 285/315 |
| 5,653,605 A * | 8/1997 | Woehl | ................ | H01R 13/622 439/321 |
| 5,823,702 A * | 10/1998 | Bynum | ................ | F16L 19/005 285/82 |
| 5,851,035 A * | 12/1998 | Marc | ................ | F16L 19/005 285/86 |
| 6,293,595 B1 | 9/2001 | Marc et al. | | |
| 6,302,447 B1 | 10/2001 | Lee | | |
| 6,445,177 B1 * | 9/2002 | Higgins | ............... | B03C 1/286 324/204 |
| 6,557,900 B1 * | 5/2003 | Austin | ................ | F16L 19/005 285/354 |
| 6,824,170 B2 | 11/2004 | Lee | | |
| 6,857,665 B2 | 2/2005 | Vyse | | |
| 6,948,410 B1 * | 9/2005 | Larson | ............... | B25B 23/1427 173/176 |
| 7,600,789 B2 * | 10/2009 | Vyse | ................ | F16L 19/005 285/305 |
| 7,887,098 B2 * | 2/2011 | Aas | ....................... | F16L 15/08 285/391 |
| 8,764,361 B2 * | 7/2014 | Seaman | ................ | A47K 13/26 411/125 |
| 8,882,384 B2 | 11/2014 | Bynum | | |
| 8,992,148 B2 * | 3/2015 | Schafer | ............... | H01R 13/622 285/92 |
| 9,188,261 B2 * | 11/2015 | Marc | .................... | F16L 19/005 |
| 2002/0008386 A1 * | 1/2002 | Lee | ...................... | F16L 19/005 285/322 |
| 2004/0017077 A1 * | 1/2004 | Vyse | ..................... | F16L 19/005 285/92 |
| 2004/0150224 A1 * | 8/2004 | Lee | ....................... | F16L 37/086 285/317 |
| 2006/0281972 A1 * | 12/2006 | Pease | ................ | A61B 1/00052 600/109 |
| 2007/0052234 A1 * | 3/2007 | Breay | .................... | F16L 25/01 285/354 |
| 2008/0199252 A1 * | 8/2008 | Frey | .................. | G02B 23/2476 403/325 |
| 2008/0248673 A1 * | 10/2008 | Boehnlein | .......... | A61B 1/00052 439/320 |
| 2011/0318098 A1 * | 12/2011 | Gloaguen | ............ | F16L 19/005 403/350 |
| 2014/0265324 A1 * | 9/2014 | McAlister | ............... | F16L 21/08 285/355 |
| 2015/0101173 A1 * | 4/2015 | Hartmann | ............. | F16L 37/088 29/525.01 |
| 2016/0123373 A1 * | 5/2016 | Gambardella | ........ | F01D 11/003 411/108 |
| 2016/0194976 A1 * | 7/2016 | Smith | .................. | F01D 21/003 415/118 |

* cited by examiner

SELF-LOCKING PLUG

CLAIM TO PRIORITY

This application is a continuation-in-part application of application Ser. No. 14/505,600, filed on Oct. 3, 2014, the entire contents of which are incorporated herein by reference.

BACKGROUND OF THE INVENTION

The invention pertains to plugs, and in particular to a self-locking threaded plug that can be used as a borescope plug, a drain plug, an access plug, a chip detector plug, and other similar threaded parts.

In the aircraft engine industry, for example, many engines include double walled structures, such as a compressor, a combustor and the like, where the outer and inner walls are respectively provided with a number of borescope holes or ports. One purpose of the borescope ports is to allow inspection and monitoring of the engine. This may be accomplished by inserting inspection equipment, such as borescopes and/or probes, through the borescope ports.

Each borescope port requires a removable borescope plug to facilitate borescope inspection of the engine components through the borescope port. In addition, the borescope plug also performs a sealing function to prevent the leakage of high pressure and high temperature gas through the borescope port. Typically, the borescope ports are threaded holes in the engine cases and the borescope plugs typically screw into the ports. The borescope plugs are required to incorporate a secondary locking feature to prevent them from loosening and/or falling out while the engine is operation.

The secondary locking feature can include a number of different schemes. For example, safety wire (lock wire), tab washers, and cotter clips have been used in early engine designs. As the engine designs matured, it became obvious that self-locking secondary locking features provided improved reliability and maintainability. Many new engine designs specify self-locking borescope plugs.

Thus, there is a need to provide a self-locking plug that is highly reusable, robust in function, not prone to damage, does not contain sharp edges, does not have loose parts, and does not require special tools, techniques, or knowledge to operate. Additionally, the self-locking plug should be compact, lightweight, and easy to manufacture.

SUMMARY OF THE INVENTION

In one aspect, a self-locking plug comprises a body component including a flange; a flexible beam finger component disposed about the body component and including a plurality of axially-oriented flexible beam fingers, a flange radially inward from the flexible beam fingers, and one or more outwardly extending tabs; an annular detent ring component including a plurality of circumferentially-arranged detents separated by ridges in radial alignment with the plurality of flexible beam fingers; and a biasing component engaging the flange of the flexible beam finger component and the annular detent ring component for providing a biasing force to urge the flexible beam finger component in a direction of a central, longitudinal axis, A, of the self-locking plug, wherein the plurality of flexible beam fingers travel across the plurality of detents to cause elastic deformation of the flexible beam fingers when the body component is rotated about the central, longitudinal axis, A, of the self-locking plug, and wherein the flange of the body component engages the flange of the flexible beam finger component when the self-locking plug is assembled.

In another aspect, a self-locking plug comprises a body component including a flange; a flexible beam finger component disposed about the body component and including a plurality of axially-oriented flexible beam fingers, a flange radially inward from the flexible beam fingers, and one or more outwardly extending tabs; an annular detent ring component including a plurality of circumferentially-arranged detents separated by ridges in radial alignment with the plurality of flexible beam fingers; and a biasing component engaging the flange of the flexible beam finger component and the annular detent ring component for providing a biasing force to urge the flexible beam finger component in a direction of a central, longitudinal axis, A, of the self-locking plug, wherein the plurality of flexible beam fingers travel across the plurality of detents to cause elastic deformation of the flexible beam fingers when the body component is rotated about the central, longitudinal axis, A, of the self-locking plug, and wherein the one or more outwardly extending tabs of the flexible beam finger component engage a slot formed in a borescope port to prevent rotation of the self-locking plug when the body component rotates about the central, longitudinal axis of the self-locking plug, thereby providing an anti-rotation feature between the flexible beam finger component and the borescope port.

In yet another aspect of the invention, a self-locking plug comprises a body component including a flange; a flexible beam finger component disposed about the body component and including a plurality of axially-oriented flexible beam fingers, a flange radially inward from the flexible beam fingers, and one or more outwardly extending tabs; an annular detent ring component including a plurality of circumferentially-arranged detents separated by ridges in radial alignment with the plurality of flexible beam fingers; and a biasing component engaging the flange of the flexible beam finger component and the annular detent ring component for providing a biasing force to urge the flexible beam finger component in a direction of a central, longitudinal axis, A, of the self-locking plug, wherein the plurality of flexible beam fingers travel across the plurality of detents to cause elastic deformation of the flexible beam fingers when the body component is rotated about the central, longitudinal axis, A, of the self-locking plug, and wherein the one or more outwardly extending tabs of the flexible beam finger component includes a slot that engages a tab formed in a borescope port to prevent rotation of the self-locking plug when the body component rotates about the central, longitudinal axis of the self-locking plug, thereby providing an anti-rotation feature between the flexible beam finger component and the borescope port.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
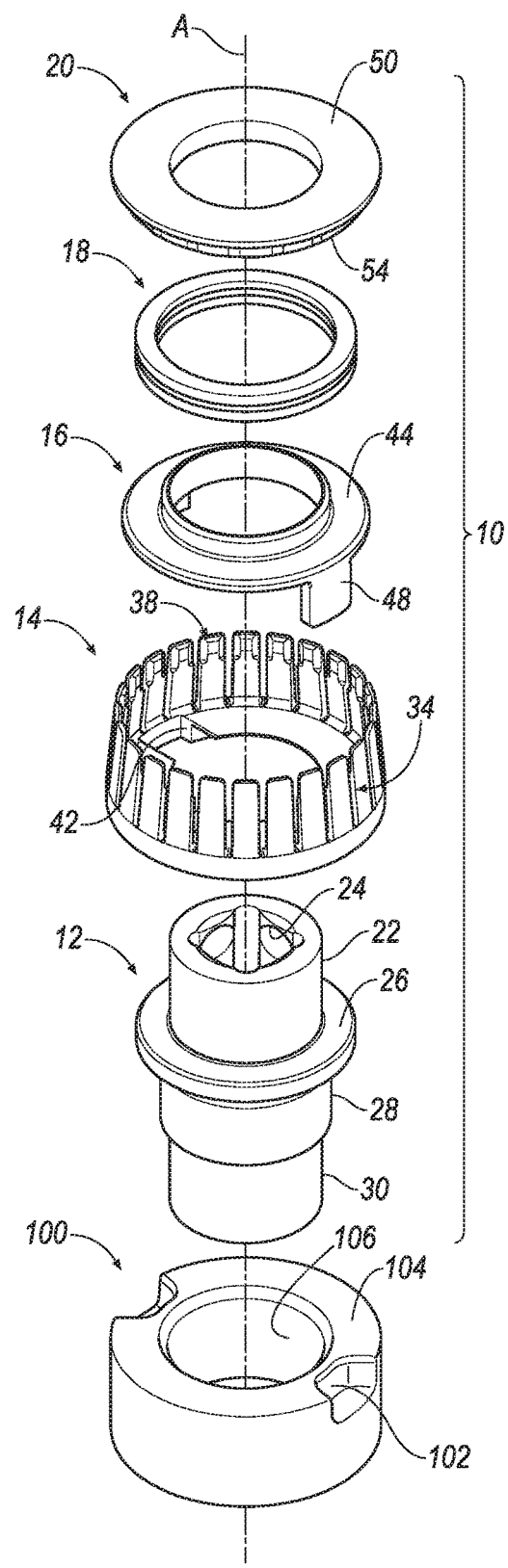
FIG. 1 is an exploded view of a self-locking plug according to an embodiment of the invention.
Figure 2:
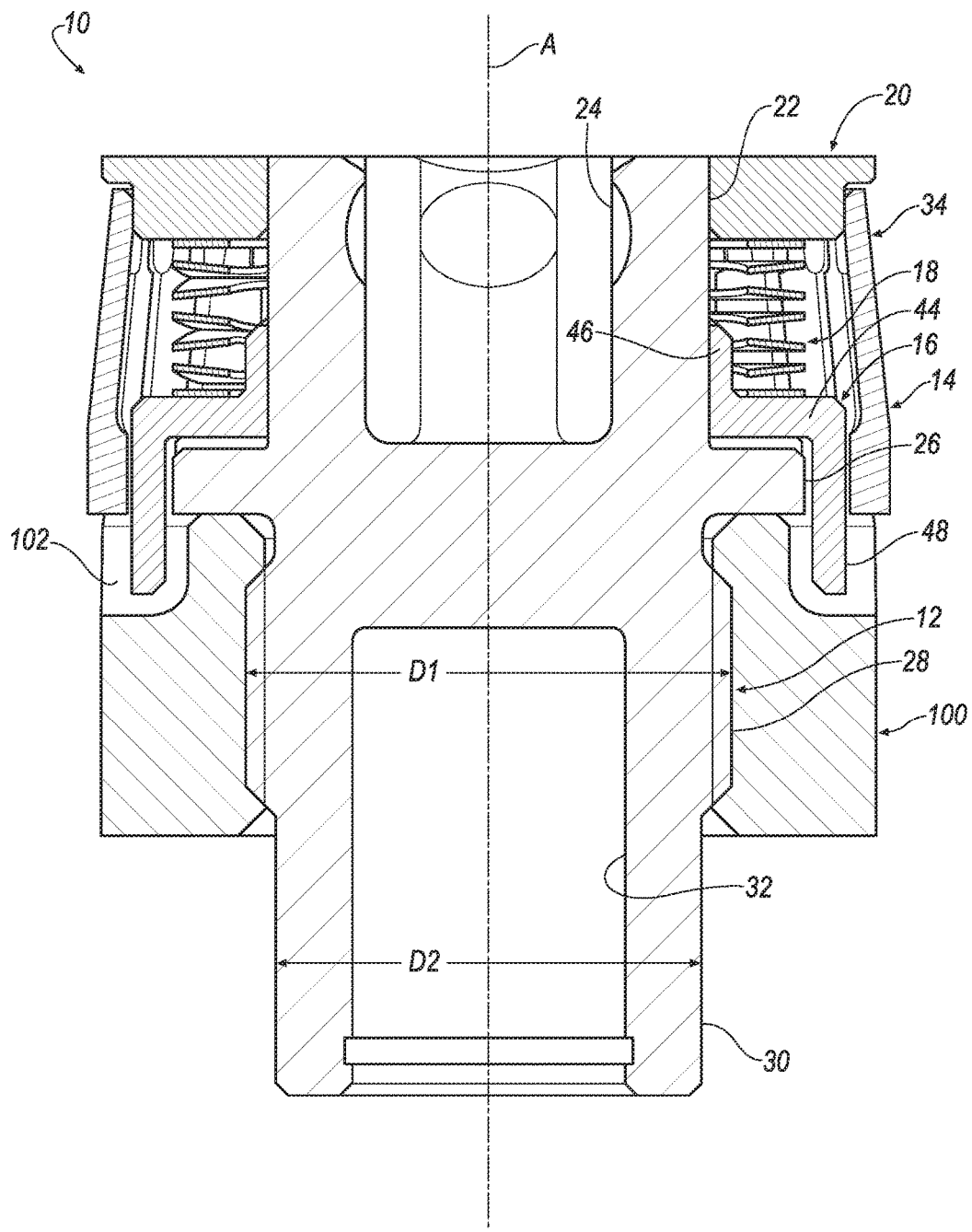
FIG. 2 is a cross-sectional view of the self-locking plug of FIG. 1 when assembled.
Figure 3:
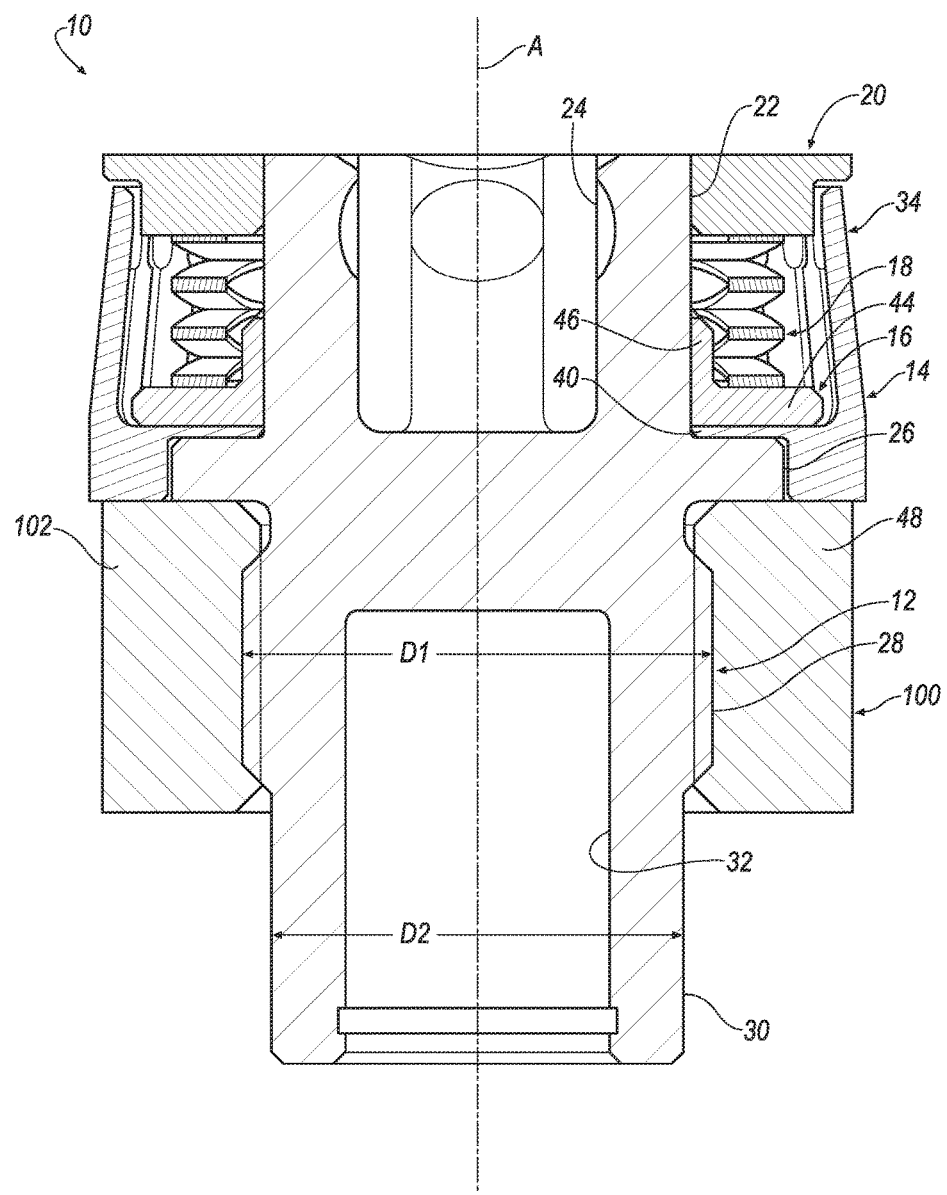
FIG. 3 is another cross-sectional view of the self-locking plug of FIG. 1 when assembled.

Referring now to FIGS. 1-3, a self-locking plug 10 is shown according to an embodiment of the invention. In the illustrated embodiment, the self-locking plug 10 is intended for use with a borescope port 100, such as the type used in a jet aircraft engine. However, it will be appreciated that the invention is not limited by the intended use as a borescope plug, and that the invention can be used in other applications, such as a drain plug, an access plug, a chip detector, and other similar parts.

In general, the self-locking plug 10 comprises five (5) basic components: a body component 12, a flexible beam finger component 14, a tab sleeve component 16, a biasing component 18, such as a wave spring, and the like, and an annular detent ring component 20.

Figure 4:
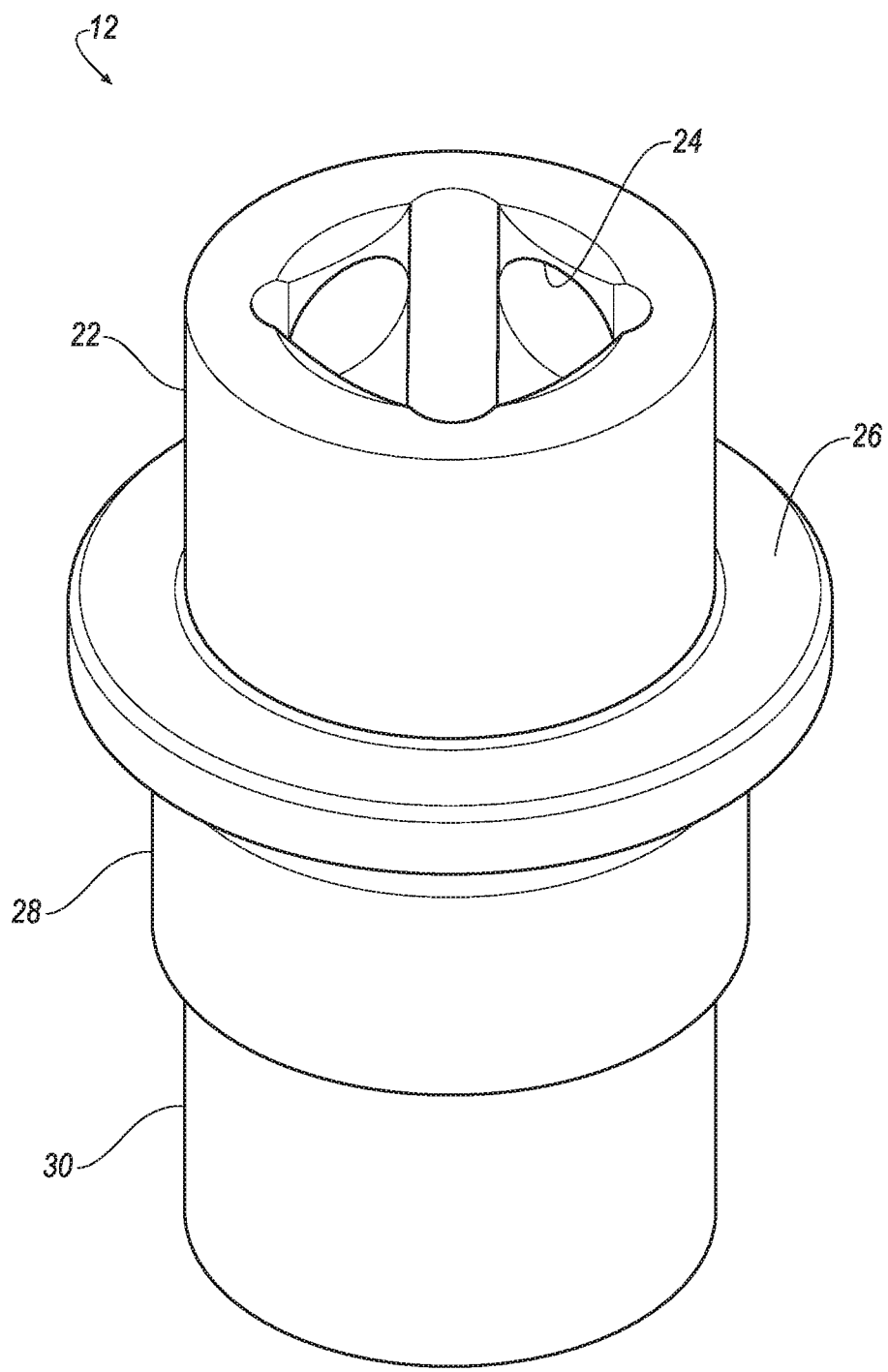
FIG. 4 is an isometric view of the body component according to an embodiment of the invention.

Referring now to FIGS. 1 and 4, the body component 12 includes a head 22 to allow a tool (not shown), such as a wrench, and the like, to rotate the body component 12 about a central axis, A, of the self-locking plug 10. The head 22 is an internal drive 24, such as a standard square recess, Allen socket, splined socket, an external hex, and the like. The body 22 also includes a flange 26 that engages the annular flexible beam finger component 14 and the borescope port 100 when the self-locking plug 10 is assembled, as shown in FIGS. 2 and 3. Referring back to FIGS. 1 and 4, the body 22 also includes an upper cylindrical portion 28 and a lower cylindrical portion 30 located on the opposite side of the flange 26 than the head 22. As shown in FIGS. 2 and 3, the upper cylindrical portion 28 has an outer diameter, D1, than is slightly smaller than the inner diameter of the borescope port 100, while the lower cylindrical portion 30 has a smaller outer diameter, D2, than the upper cylindrical portion 28. As a result, the lower cylindrical portion 30 can be easily inserted into a central aperture 106 of the borescope port 100 until the flange 26 of the body component 12 engages the borescope port 100. The body component 12 may also include a circular-shaped recess 32 formed in the upper and lower cylindrical portions 28, 30. The recess 32 causes the upper and lower cylindrical portions 28, 30 to be annular in shape, rather than solid, thereby reducing the overall weight of the self-locking plug 10.

Figure 5:
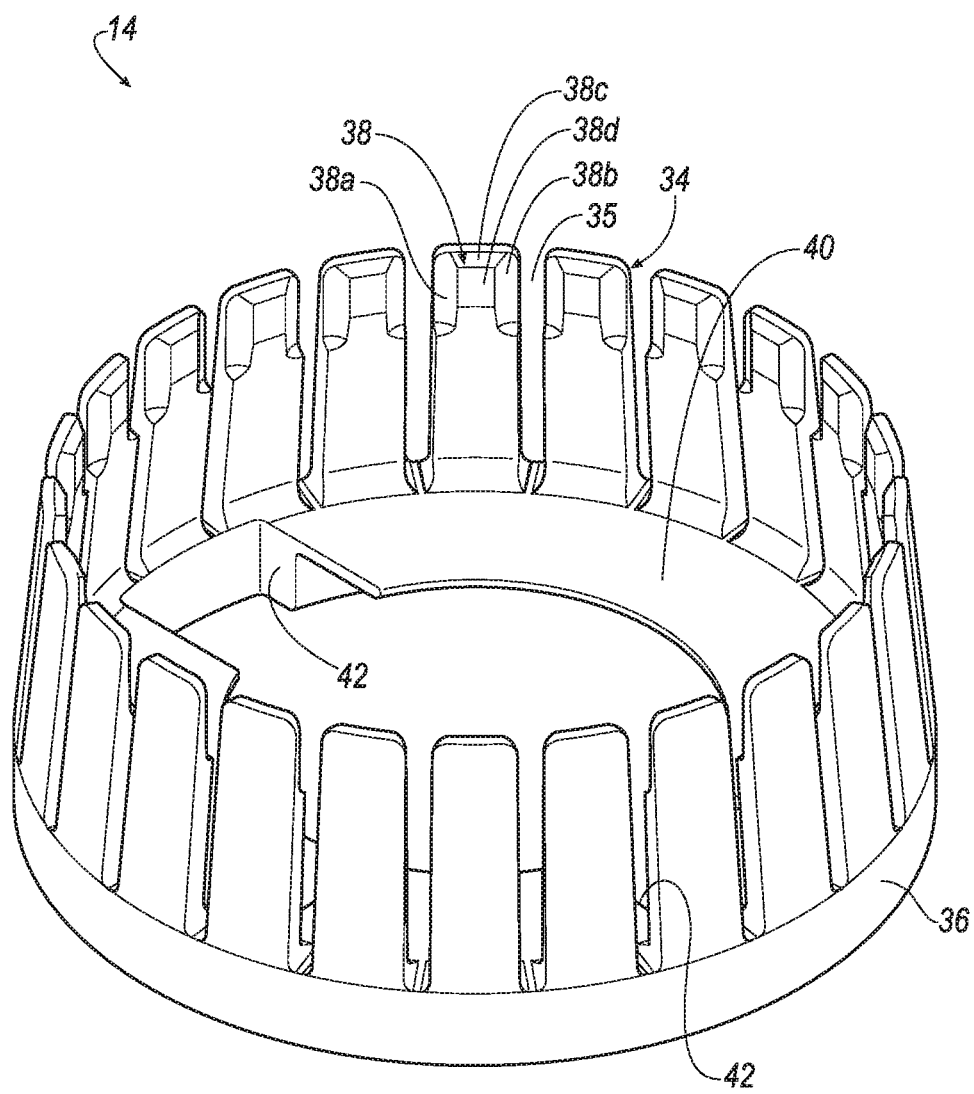
FIG. 5 is an isometric view of the flexible beam finger component according to an embodiment of the invention.

Referring now to FIGS. 1 and 5, the flexible beam finger component 14 includes a plurality of flexible beam fingers 34 forming a plurality of slots 35 therebetween. The flexible beam fingers 34 extend upwardly (i.e. in the axial direction or Z-axis direction) in a circular arrangement from a ring portion 36. Each flexible beam finger 34 has a radially inward beveled fingertip 38 adapted to engage the annular detent ring 20. Each beveled fingertip 38 is formed with a pair of opposing beveled side surfaces 38a, 38b, a substantially planar side surface 38c extending between the beveled side surfaces 38a, 38b, and a substantially planar top surface 38d connecting the side surfaces 38a, 38b, 38c. The beveled shape of the side surfaces 38a, 38b facilitate the mechanical interaction with the annular detent ring 20. The flexible beam finger component 14 also includes a flange 40 extending radially inward with respect to the ring portion 36. The flange 40 engages the flange 26 of the body component 12 when the self-locking plug 10 is assembled, as shown in FIG. 3.

In the illustrated embodiment, one or more slots 42 are formed in the flange 40. The slots 42 are adapted to receive a corresponding tab 48 of the tab sleeve component 16 when the self-locking plug 10 is assembled, as shown in FIG. 2. In the illustrated embodiment, the flexible beam finger component 14 includes two slots 42 that are arranged to be diametrically opposite each other, i.e., 180 degrees apart from each other. However, the invention is not limited by the number of slots 42, and that the invention can be practiced with any desirable number of slots, so long as the number of slots correspond to the number of tabs formed on the tab sleeve component 16. For example, the flange 40 can have three slots 42 located 120 degrees apart from each other. In another example, the flange 40 can have four slots 42 located 90 degrees apart from each other.

The purpose of the one or more slots 42 is to accommodate the one or more tabs 48 of the tab sleeve component 16 and prevent rotation therebetween when the one or more tabs 48 are received by the one or more slots 42. Thus, the slot 42, in combination with the tab 48, provides an anti-rotation feature between the flexible beam finger component 14 and the tab sleeve component 16 of the self-locking plug 10. It will be appreciated that the invention is not limited by the use of a slot on the tab sleeve component 16, and that the invention can be practiced with other known means for the slot 42. For example, the slot 42 can be replaced with a female hex, a Double-D, or a number of other forms that could be complimentary to the form on the flexible beam finger component 14.

Figure 6:
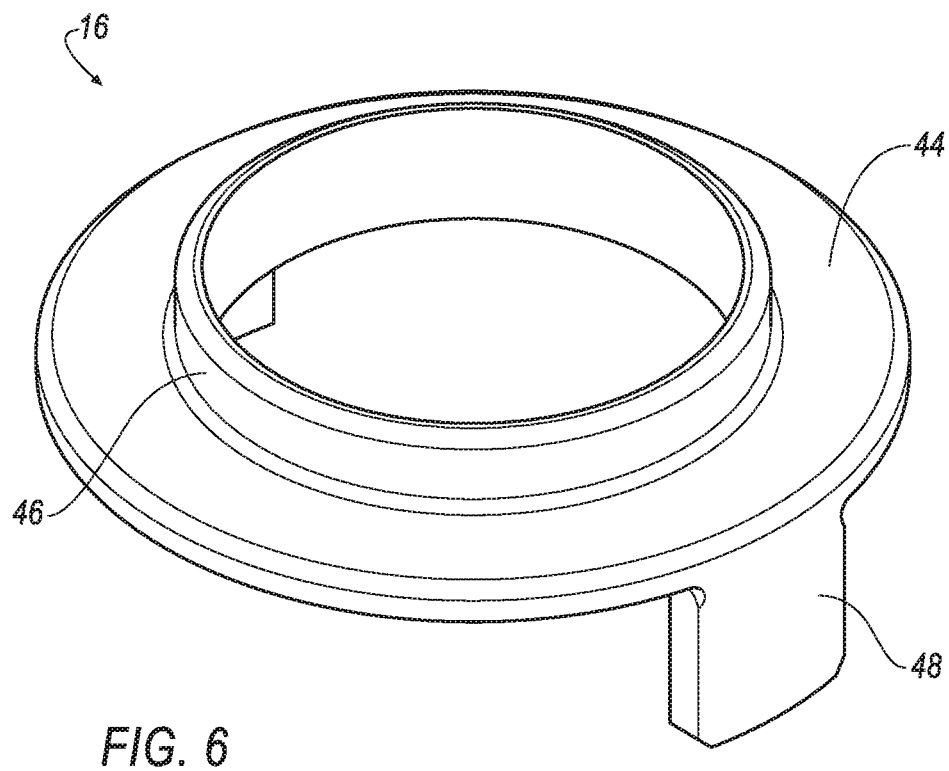
FIG. 6 is an isometric view of the tab sleeve component according to an embodiment of the invention.

Referring now to FIGS. 1 and 6, the tab sleeve component 16 comprises a generally annular ring 44 and an upwardly extending band 46 having an inside diameter slightly larger than the outside diameter of the head 22 of the body component 12. As a result, the tab sleeve component 16 can be slipped over the head 22 of the body component 12 such that the flange 44 of the tab sleeve component 16 engages the flange 40 of the flexible beam finger component 14 when the self-locking plug 10 is assembled, as shown in FIGS. 2 and 3. The tab sleeve component 16 also includes one or more tabs 48 extending downward from the ring 44. The tabs 48 are adapted to be received by a corresponding slot 42 of the flexible beam finger component 14 when the self-locking plug 10 is assembled, as shown in FIG. 2.

In the illustrated embodiment, the tab sleeve component 16 includes two tabs 48 that are arranged to be diametrically opposite each other, i.e., 180 degrees apart from each other. However, the invention is not limited by the number of tabs 48, and that the invention can be practiced with any desirable number of tabs, so long as the number of tabs correspond to the number of slots formed on the flexible beam finger component 14. For example, the tab sleeve component 16 can have three tabs 48 located 120 degrees apart from each other. In another example, the tab sleeve component 16 can have four tabs 48 located 90 degrees apart from each other.

The purpose of the one or more tabs 48 is to engage a slot 102 formed in the top surface 104 of the borescope port 100 and prevent rotation of the self-locking plug 10 when the head 22 of the body component 12 is rotated by the tool. Thus, the tab 48, in combination with the slot 102, provides an anti-rotation feature between the tab sleeve component 16 of the self-locking plug 10 and the borescope port 100. It will be appreciated that the invention is not limited by the use of a slot on the borescope port 100, and that the invention can be practiced with other known means for the slot 102. For example, the slot 102 can be replaced with a female hex, a Double-D, or a number of other forms that could be complimentary to the form on the borescope port 100. In another example, the slot 102 can be eliminated with a port larger in diameter and holes can be used instead of cutouts. In this example, the tab 48 may have a narrower width to enable the tab 48 to fit into the holes. In yet another example, the port does not include holes or cutouts. Instead, the tab 48 would have a wider width, angled and have a slot machined in the center of the tab 48.

Figure 7:
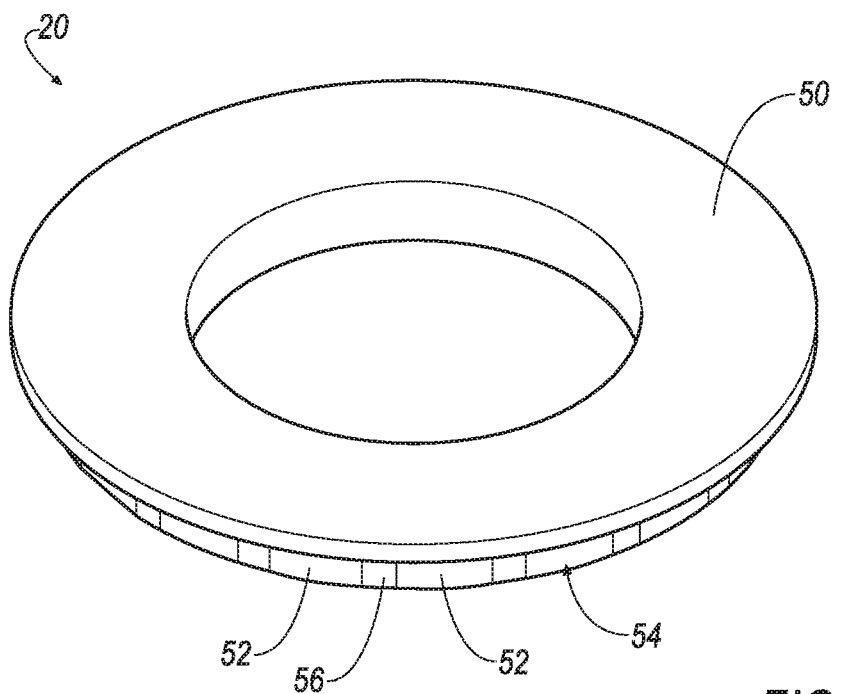
FIG. 7 is an isometric view of the annular detent ring component according to an embodiment of the invention.

Referring now to FIGS. 1 and 7, the annular detent ring component 20 includes an upper flange portion 50 and a plurality of detents 52 formed on an outer circumferential surface 54. The annular detent ring component 20 has an inner diameter slightly larger than the outer diameter of the head 22 of the body component 12. As a result, the annular detent ring component 20 can be slipped over the head 22 of the body component 12 when the self-locking plug 10 is assembled, as shown in FIGS. 2 and 3. The upper flange portion 50 prevents unwanted axial movement of the flexible beam finger component 14 when the self-locking plug 10 is assembled, thereby acting as a stop. As shown in FIG. 7, each detent 52 has a generally concave surface and is separated by a substantially planar surface 56. The concave profile of each detent 52 facilitates the interaction with the flexible beam fingers 34 of the beam finger component 14.

In the illustrated embodiment, the annular detent ring component 20 includes a different number of detents 52 and beam fingers 34. However, it will be appreciated that the invention can be practiced with any desirable number of detents 52 and beam fingers 34. For example, the invention can be practiced with the same number of detents 52 and beam fingers 34.

To assemble the self-locking plug 10, the flexible beam finger component 14 is disposed about the body component 12. Specifically, the flange 26 of the body component 12 and the flange 40 of the flexible beam finger component 14 engage each other when the flexible beam finger component 14 is disposed about the body component 12. Then, the tab sleeve component 16 is disposed within the flexible beam finger component 14. Then, the wave spring 18 is disposed about the tab sleeve component 16. Finally, the annular detent ring component 20 is fixedly attached to the body component 12 such that the plurality of detents 52 are engaged with the plurality of flexible beam fingers 34.

When assembled, the wave spring 18 is disposed between the tab sleeve component 16 and the annular detent ring component 20. Once the detent ring component 20 is attached to the upper portion 22 of the body component 12, the wave spring 18 provides a biasing force to urge the tab sleeve component 16 in a downward direction (i.e. toward the borescope port 100) along the central, longitudinal axis, A, of the self-locking plug 10. It is noted that the self-locking plug 10 uses the wave spring 18 as a biasing means, rather than a coil spring. It has been found that the use of the wave spring 18 produces less stress than a comparable coil spring, making the wave spring 18 far more resistant to failure by breakage or relaxation as compared to the coil spring. However, it will be appreciated that the invention is not limited by the use of a wave spring to provide the biasing force against the various components, and that the invention can be used with any desirable means that is well-known in the art for providing a biasing force against the various components. For example, it might be advantageous to use a coil spring instead of a wave spring, particularly if there is not a size constraint to do so.

In operation, the flexible beam finger component 14 is free to rotate about the central axis, A, while the annular detent ring component 20 does not rotate once fixedly attached to the body component 12. As the body component 12 is rotated by the tool (not shown) about the central axis A of the self-locking plug 10, the plurality of axially-oriented flexible beam fingers 34 on the flexible beam finger component 14 engage the circumferentially-arranged detents 54 formed on the annular detent ring component 20. As the plurality of detents 54 travel across and engage the flexible beam fingers 34, the detents 54 cause elastic deformation of the flexible beam fingers 34. In other words, the detents 54 cause the flexible beam fingers 34 to be periodically deflected in a radial direction (i.e. in the X-axis direction) by a varying amount, resulting in a biased resistance each time a beam finger 34 (or set of fingers) is deflected. This biased resistance has a positive clicking effect that can be audibly detected by the user, and generates a predictable and measurable prevailing torque, which is precisely engineered to be within a specific range (in lb/in) for a specific number of cycles. This prevailing torque has been shown to prevent loosening of the self-locking plug 10, particularly in aircraft borescope plug applications.

It is noted that the detents 54 are always engaged with the flexible beam fingers 34 when the flexible beam finger component 14 is rotated relative to the annular detent ring component 20. It is also noted that the flexible beam finger component 14 is free to rotate about the central axis, A, but is captured in the axial direction (i.e. in the Z-axis direction) by the annular detent ring component 20 and the borescope port 100, as shown in FIG. 3. Further, the tab sleeve component 16 can move in the axial direction (i.e. in the Z-axis direction), but only by a pre-determined amount, and is eventually captured when the tabs 48 of the tab sleeve component 16 are seated in the slot 102 on the top surface 104 of the borescope port 100, as shown in FIG. 2. It is noted that the biasing force exerted by the wave spring 18 ensures that the tabs 48 remain seated in the slot 102 as the body component 12 is further rotated by the tool (not shown).

Once the tabs 48 engage the slot 102, the flexible beam fingers 34 and detents 54 activate and generate prevailing torque as the body component 12 is further rotated further by the tool.

As described above, the flexible beam finger component 14 rotates relative to the annular detent ring component 20. However, it should be appreciated by one skilled in the art that the invention can be practiced in reverse, i.e., with the annular detent ring component 20 rotating relative to the flexible beam finger component 14.

The design of the self-locking plug 10 of the invention has several distinct advantages as compared to conventional plugs. First, the body component 12 of the self-locking plug 10 seats directly against the borescope port 100, which assures superior squareness, strength and sealing. Second, the flexible beam fingers 34 and detents 54 work fully independently of the wave spring 18. As a result, the self-locking plug 10 remains securely seated against the borescope port 100, even though the wave spring 18 may have failed. Third, the use of the wave spring 18, rather than a coil spring, provides less stress and more resistance to failure by breakage of relaxation. Finally, the design of the self-locking plug 10 of the invention is far more compact than conventional plug designs.

Referring now to FIGS. 8-14, a self-locking plug 200 is shown according to another embodiment of the invention. In general, the self-locking plug 200 is substantially identical to the self-locking plug 10, except that the tab sleeve component 16 is omitted in the self-locking plug 200. Thus, the self-locking plug 200 comprises four (4) basic components: a body component 212, a flexible beam finger component 214, a biasing component 218, such as a wave spring, and the like, and an annular detent ring component 220.

Figure 8:
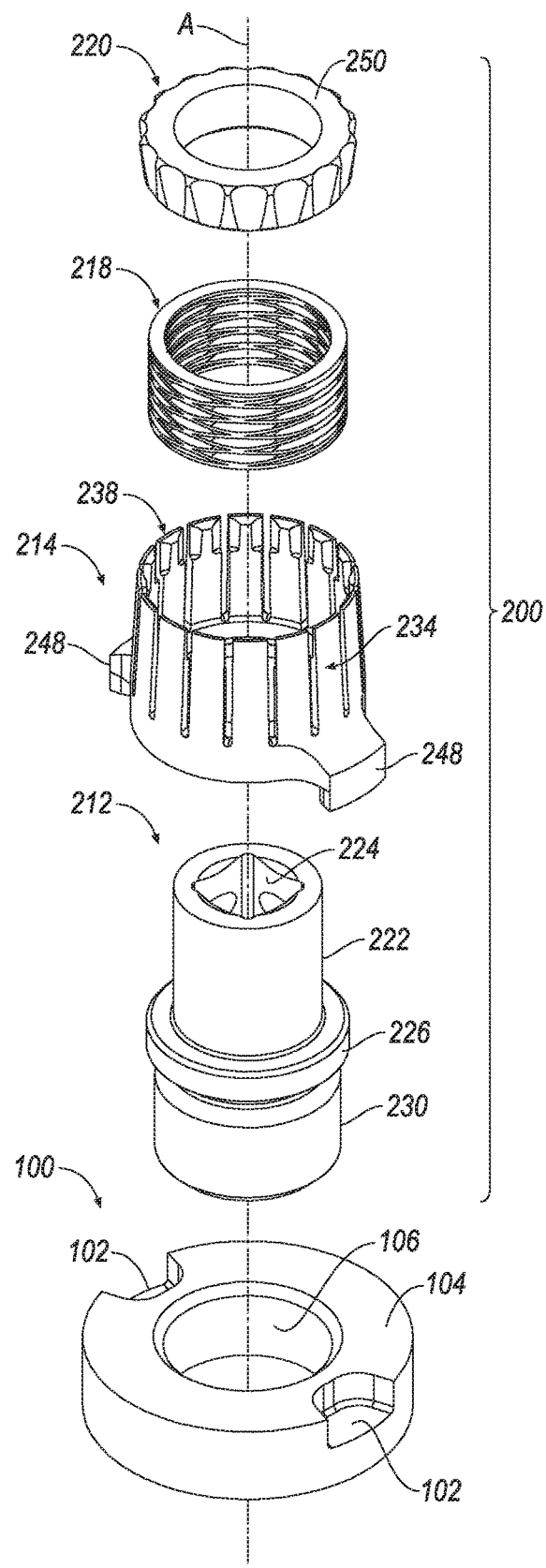
FIG. 8 is an enlarged exploded view of a self-locking plug according to another embodiment of the invention.
Figure 9:
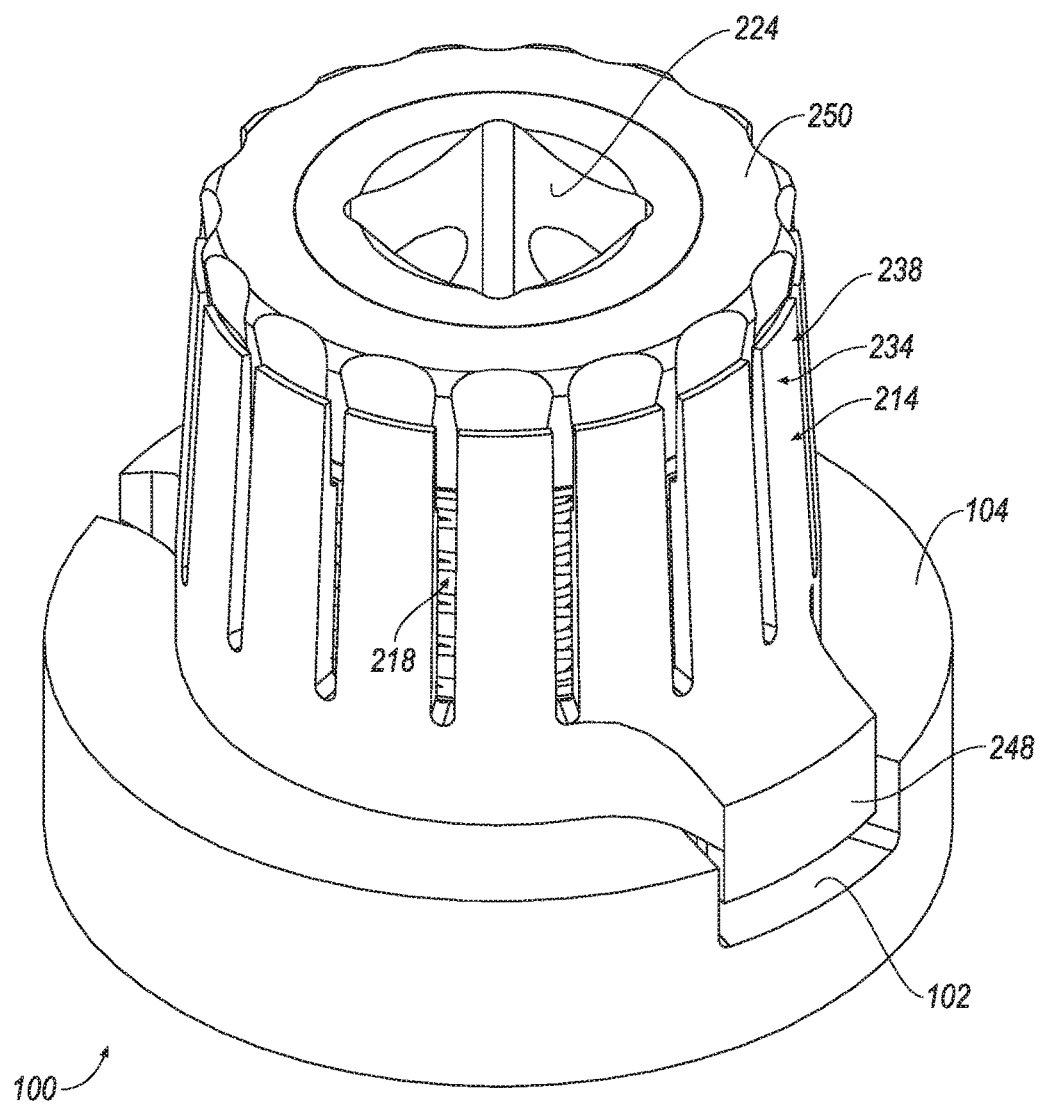
FIG. 9 is an enlarged isometric view of the self-locking plug of FIG. 8 when assembled.
Figure 11:
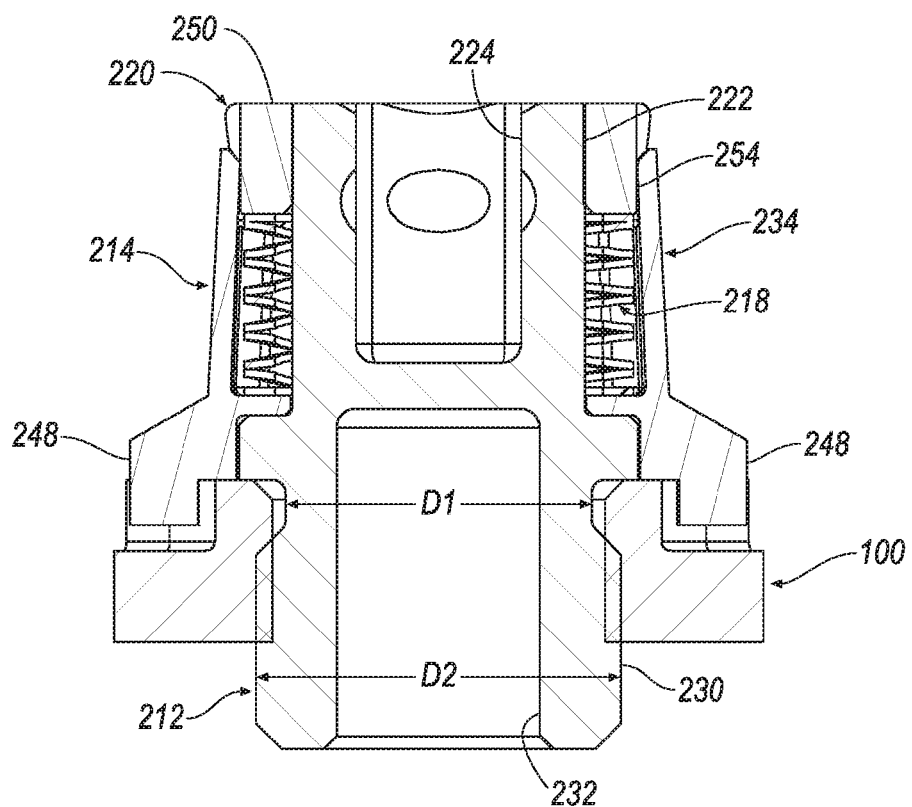
FIG. 11 is a cross-sectional view of the self-locking plug taken along line 11-11 of FIG. 10.
Figure 12:
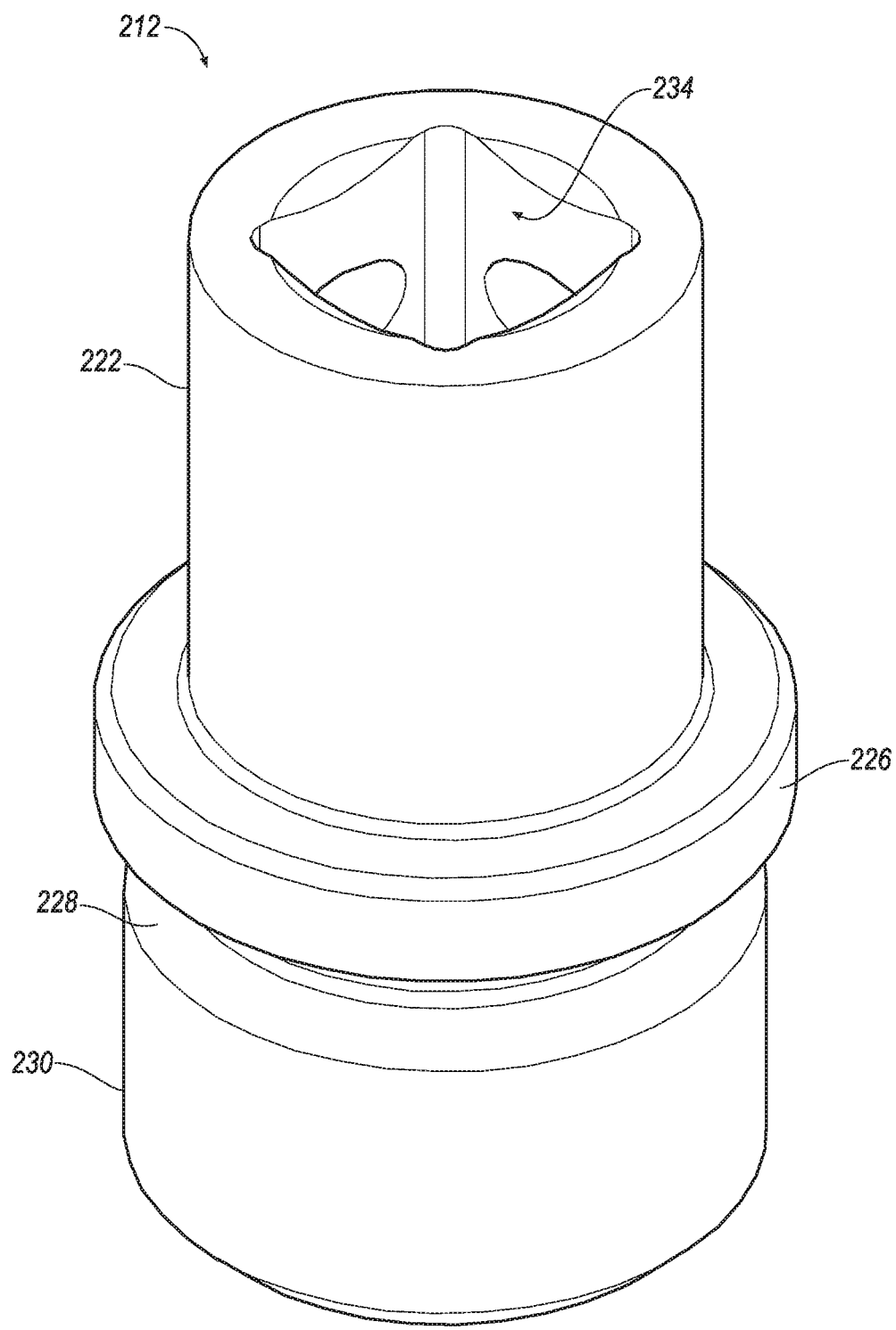
FIG. 12 is an enlarged isometric view of the body component of the self-locking plug of FIG. 8 according to an embodiment of the invention.

Referring now to FIGS. 8 and 12, the body component 212 includes a head 222 to allow a tool (not shown), such as a wrench, and the like, to rotate the body component 212 about a central axis, A, of the self-locking plug 200. The head 222 is an internal drive 224, such as a standard square recess, Allen socket, splined socket, an external hex, and the like. The body component 212 also includes a flange 226 that engages the annular flexible beam finger component 214 and the borescope port 100 when the self-locking plug 200 is assembled, as shown in FIG. 11. The body component 212 also includes an upper cylindrical portion 228 and a lower cylindrical portion 230, both located on the opposite side of the flange 226 than the head 222. As shown in FIG. 11, the upper cylindrical portion 228 has an outer diameter, D1, that is slightly smaller than an outer diameter, D2, of the lower cylindrical portion 230. The lower cylindrical portion 230 has threads that engage threads formed in a central aperture 106 of the borescope portion 100. The body component 212 may also include a circular-shaped recess 232 formed in the upper and lower cylindrical portions 228, 230. The recess 232 causes the upper and lower cylindrical portions 228, 230 to be annular in shape, rather than solid, thereby reducing the overall weight of the self-locking plug 200.

Figure 13:
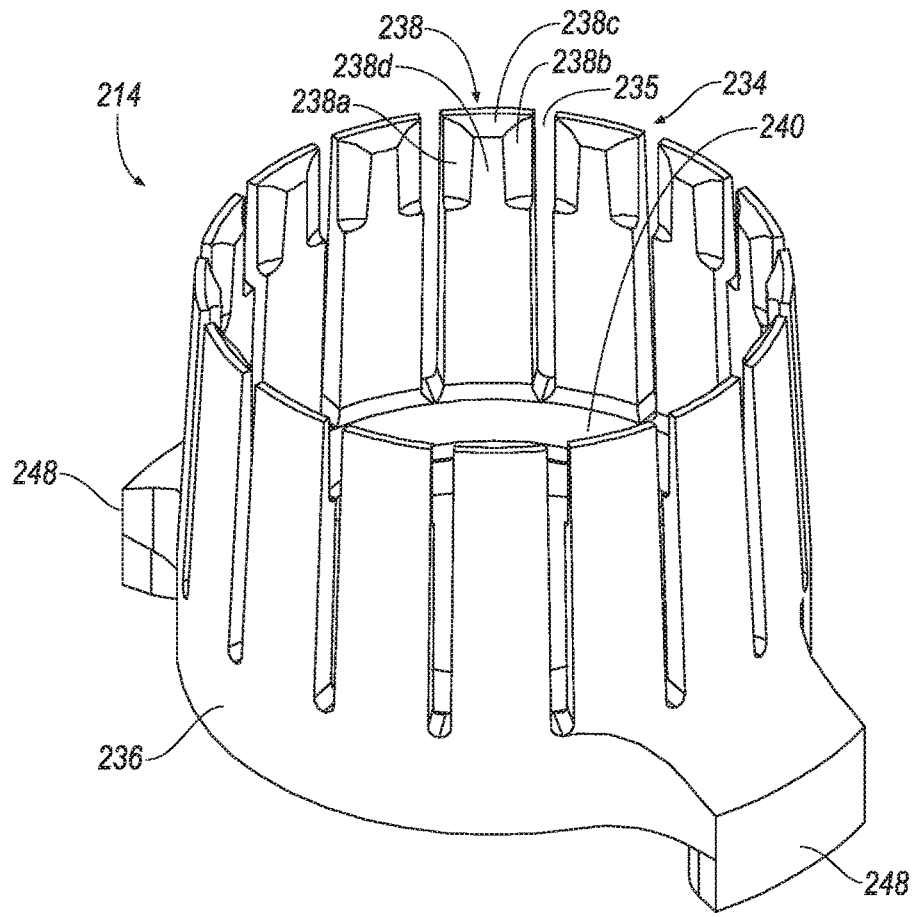
FIG. 13 is an enlarged isometric view of the flexible beam finger component of the self-locking plug of FIG. 8 according to an embodiment of the invention.

Referring now to FIGS. 8 and 13, the flexible beam finger component 214 includes a plurality of flexible beam fingers 234 forming a plurality of slots 235 therebetween. The flexible beam fingers 234 extend upwardly (i.e. in the axial direction or Z-axis direction) in a circular arrangement from a solid annular portion 236. Each flexible beam finger 234 has a radially inward beveled fingertip 238 adapted to engage the annular detent ring 220. Each beveled fingertip 238 is formed with a pair of opposing beveled side surfaces 238a, 238b, a substantially planar side surface 238c extending between the beveled side surfaces 238a, 238b, and a substantially planar top surface 238d connecting the side surfaces 238a, 328b, 238c. The beveled shape of the side surfaces 238a, 238b facilitate the mechanical interaction with the annular detent ring 220. The flexible beam finger component 214 also includes a flange 240 extending radially inward with respect to the solid annular portion 236. The flange 240 engages the flange 226 of the body component 212 when the self-locking plug 200 is assembled, as shown in FIG. 11.

Unlike the flexible beam finger component 14, the flexible beam finger component 214 includes one or more tabs 248 that extend outwardly from the solid annular portion 236 of the flexible finger beam component 212. In the illustrated embodiment, the one or more tabs 248 extend in an axial direction with respect to the central, longitudinal axis, A, of the self-locking plug 200. In the illustrated embodiment, two tabs 248 are arranged to be diametrically opposite each other, i.e., 180 degrees apart from each other. However, the invention is not limited by the number of tabs 248, and that the invention can be practiced with any desirable number of tabs. For example, the flexible beam finger component 214 can have three tabs 248 located 120 degrees apart from each other. In another example, the flexible beam finger component 214 can have four tabs 248 located 90 degrees apart from each other. It should be appreciated that the tabs 248 extending outwardly from the flexible beam finger component 214 allows the tab sleeve component 16 of the self-locking plug 10 to be omitted.

The purpose of the one or more tabs 248 is to engage a slot 102 formed in the top surface 104 of the borescope port 100 and prevent rotation of the self-locking plug 10 when the head 222 of the body component 212 is rotated by the tool. Thus, the one or more tabs 248, in combination with the slot 102, provides an anti-rotation feature between the flexible beam finger component 214 of the self-locking plug 200 and the borescope port 100. It will be appreciated that the invention is not limited by the use of a slot on the borescope port 100, and that the invention can be practiced with other known means for the slot 102. For example, the slot 102 can be replaced with a female hex, a Double-D, or a number of other forms that could be complimentary to the form on the borescope port 100.

Figure 10:
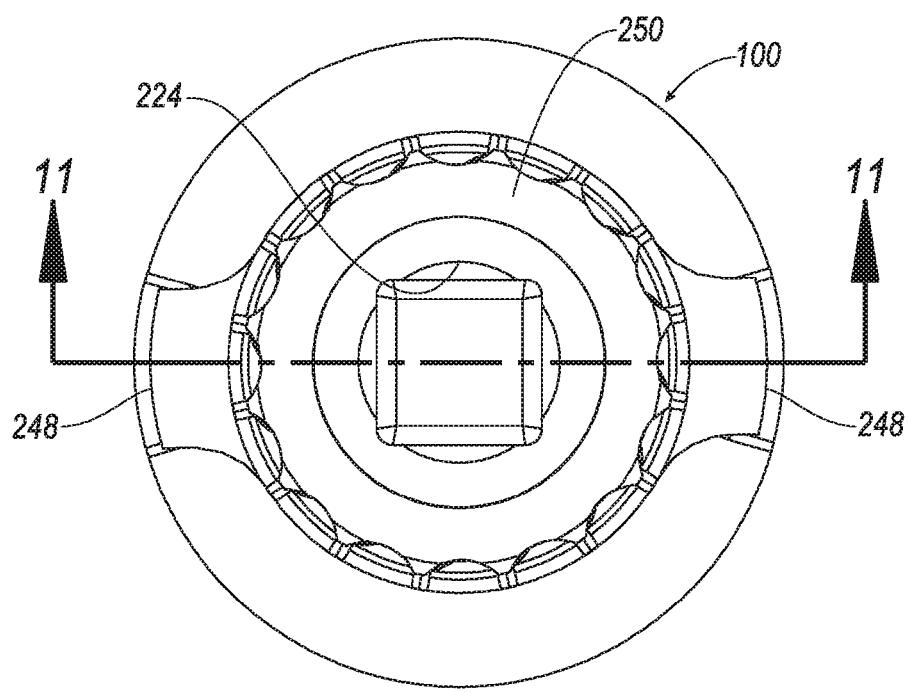
FIG. 10 is a top view of the self-locking plug of FIG. 8 when assembled.
Figure 14:
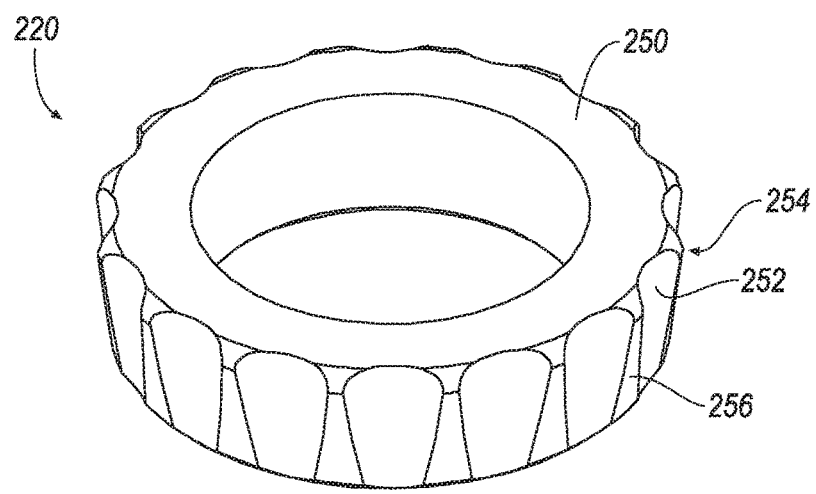
FIG. 14 is an enlarged isometric view of the annular detent ring component of the self-locking plug of FIG. 8 according to an embodiment of the invention.

Referring now to FIGS. 8 and 14, the annular detent ring component 220 includes an upper flange portion 250 and a plurality of detents 252 formed on an outer circumferential surface 254. The annular detent ring component 220 has an inner diameter slightly larger than the outer diameter of the head 222 of the body component 212. As a result, the annular detent ring component 220 can be slipped over the head 222 of the body component 212 when the self-locking plug 200 is assembled, as shown in FIGS. 10 and 11. The upper flange portion 250 prevents unwanted axial movement of the flexible beam finger component 214 when the self-locking plug 200 is assembled, thereby acting as a stop. As shown in FIG. 14, each detent 52 has a generally concave surface and is separated by a substantially planar surface 256. The concave profile of each detent 252 facilitates the interaction with the flexible beam fingers 234 of the beam finger component 214.

In the illustrated embodiment, the annular detent ring component 220 includes a different number of detents 252 and beam fingers 234. However, it will be appreciated that the invention can be practiced with any desirable number of detents 252 and beam fingers 234. For example, the invention can be practiced with the same number of detents 252 and beam fingers 234.

To assemble the self-locking plug 200, the flexible beam finger component 214 is disposed about the body component 212. Specifically, the flange 226 of the body component 212 and the flange 240 of the flexible beam finger component 214 engage each other when the flexible beam finger component 214 is disposed about the body component 212. Then, the wave spring 218 is disposed within the flexible beam finger component 214. Specifically, the wave spring 218 engages the flange 240 of the flexible beam finger component 214. Finally, the annular detent ring component 220 is fixedly attached to the body component 212 such that the plurality of detents 252 are engaged with the plurality of flexible beam fingers 234.

When assembled, the wave spring 218 is disposed between the flexible beam finger component 214 and the annular detent ring component 220. Once the detent ring component 220 is attached to the upper portion 222 of the body component 212, the wave spring 218 provides a biasing force to urge the flexible finger beam component 214 in a downward direction (i.e. toward the borescope port 100) along the central, longitudinal axis, A, of the self-locking plug 200. It will be appreciated that the invention is not limited by the use of a wave spring to provide the biasing force against the various components, and that the invention can be used with any desirable means that is well-known in the art for providing a biasing force against the various components. For example, it might be advantageous to use a coil spring instead of a wave spring, particularly if there is not a size constraint to do so.

Figure 15:
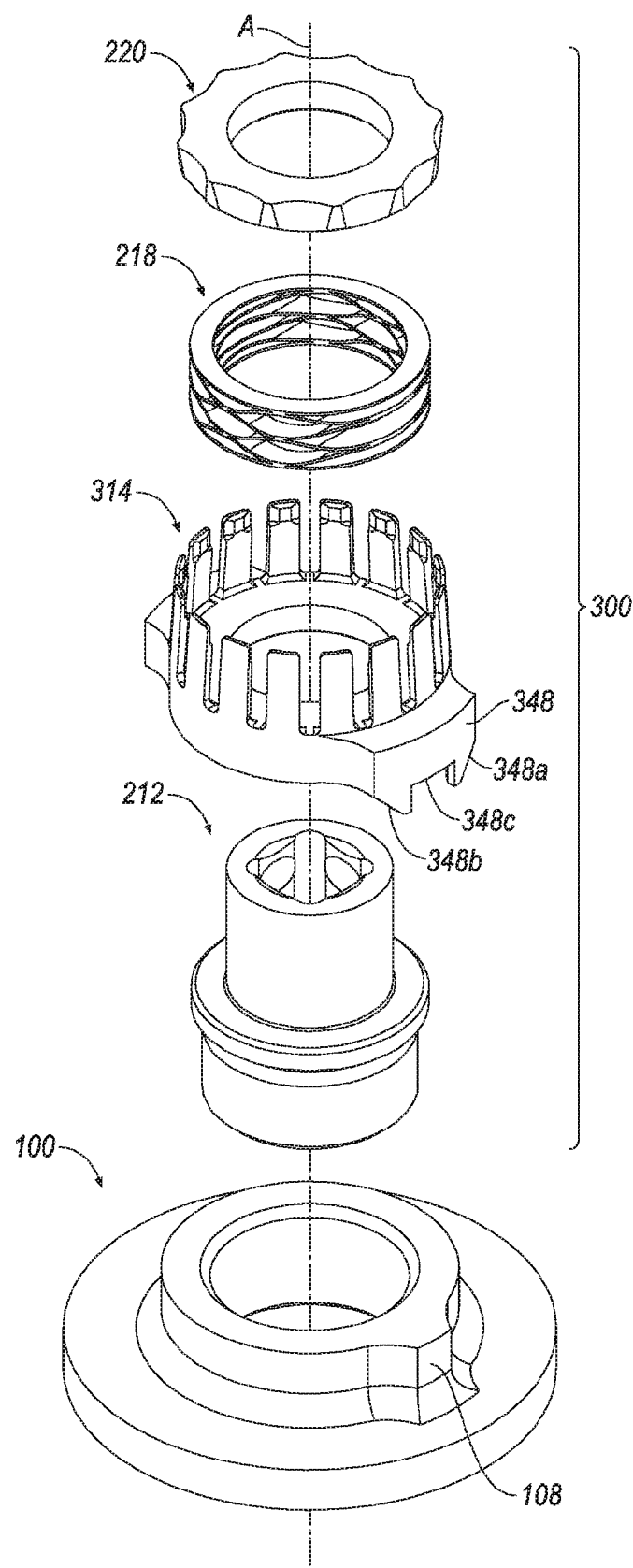
FIG. 15 is an enlarged exploded view of a self-locking plug according to another embodiment of the invention.
Figure 16:
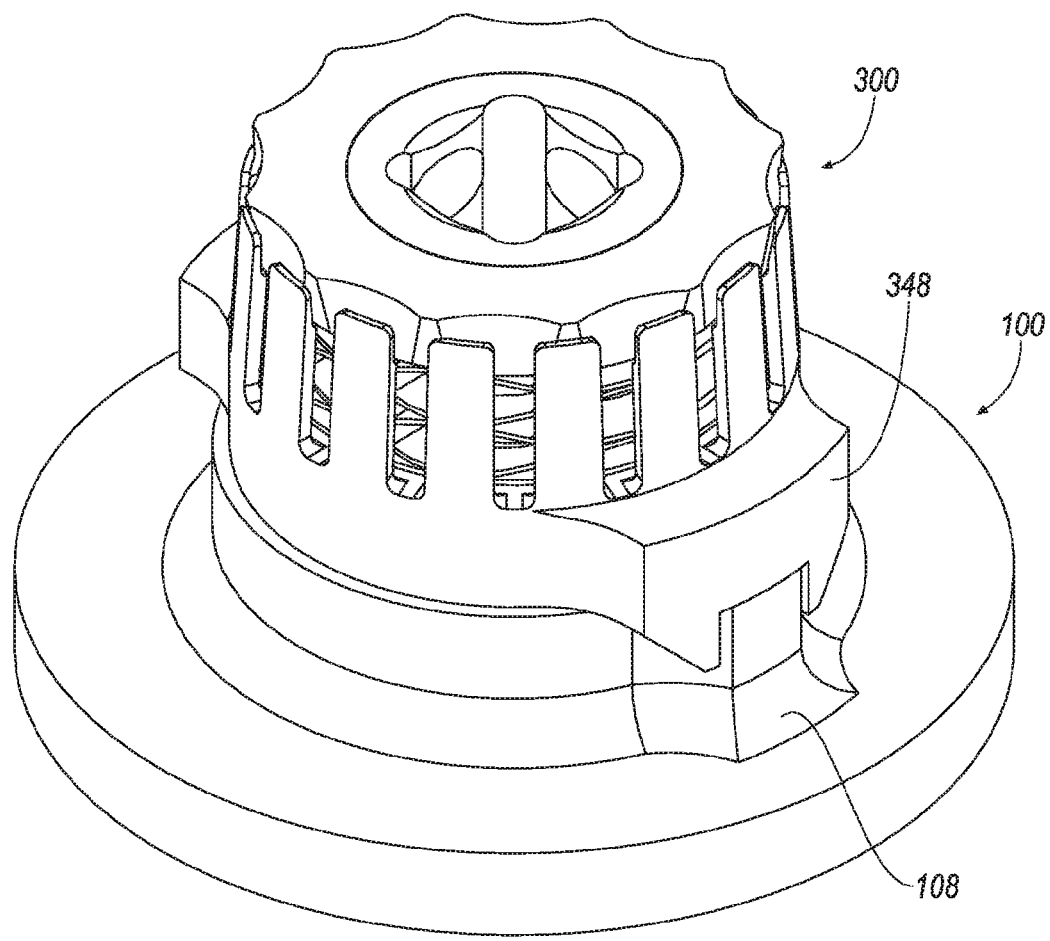
FIG. 16 is an enlarged isometric view of the self-locking plug of FIG. 15 when assembled.

It will be appreciated that the self-locking plugs 10, 200 and corresponding borescope port 100 can have a variety of different configurations, so long as the plugs 10, 200 and the port 100 are complimentary to each other. In one example shown in FIGS. 15 and 16, the flexible finger beam component 314 of the self-locking plug 300 has outwardly extending tabs 348 with a wider width than the tabs 248 of the flexible finger beam component 214. In addition, the outwardly extending tabs 348 have a pair of angled surfaces 348a, 348b and a slot 348c therebetween. In this example, the slot 102 of the borescope port 100 is replaced with an outwardly extending tab 108 that interacts with the outwardly extending tabs 348 when the self-locking plug 300 is threaded into the borescope port 100.

Figure 17:
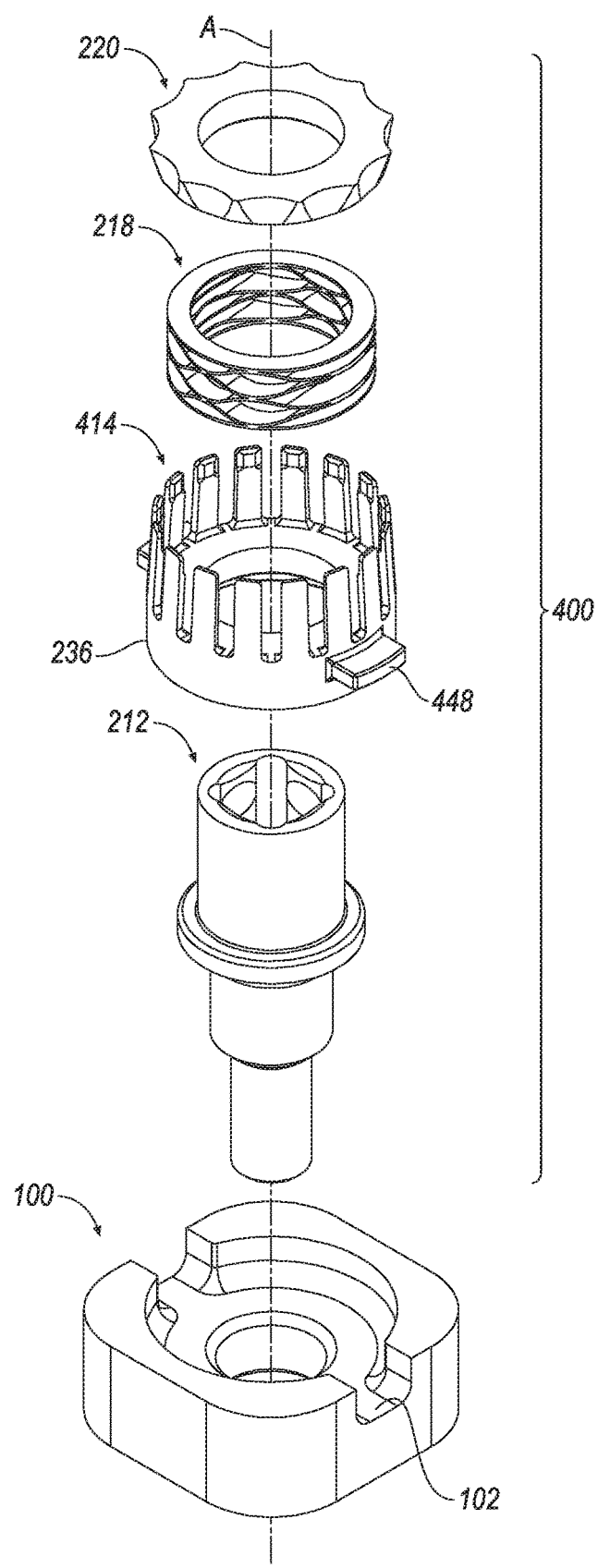
FIG. 17 is an enlarged exploded view of a self-locking plug according to another embodiment of the invention.
Figure 18:
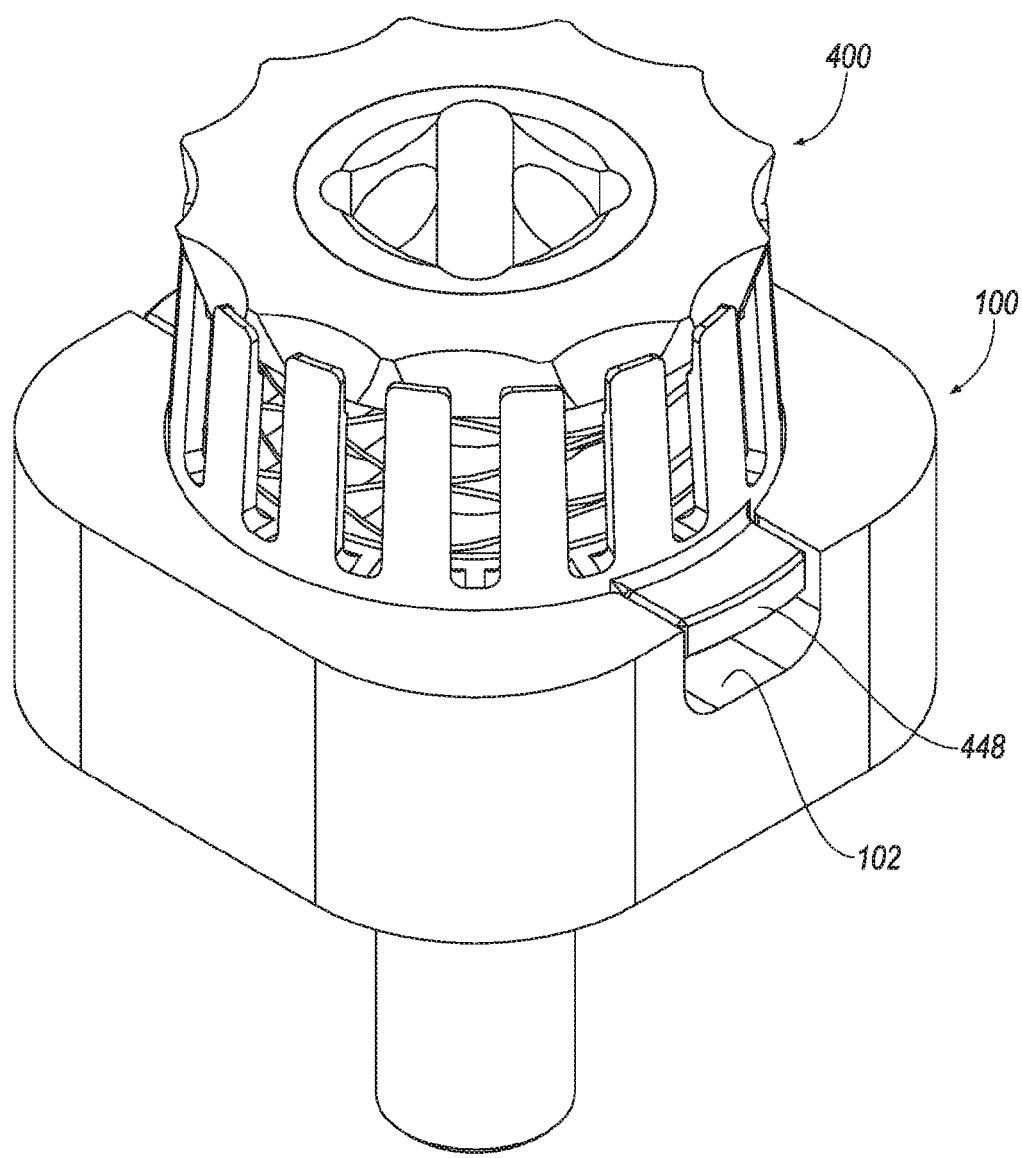
FIG. 18 is an enlarged isometric view of the self-locking plug of FIG. 17 when assembled.

In another example shown in FIGS. 17 and 18, the flexible finger beam component 414 of the self-locking plug 400 has one or more tabs 448 that extend radially outward from the solid annular portion 236 (i.e. in a radial direction with respect to the central, longitudinal axis, A, of the self-locking plug 400). In this example, the slot 102 of the borescope port 100 is a substantially U-shaped cutout that interacts with the radially outward extending tabs 448 when the self-locking plug 400 is threaded into the borescope port 100.

Figure 19:
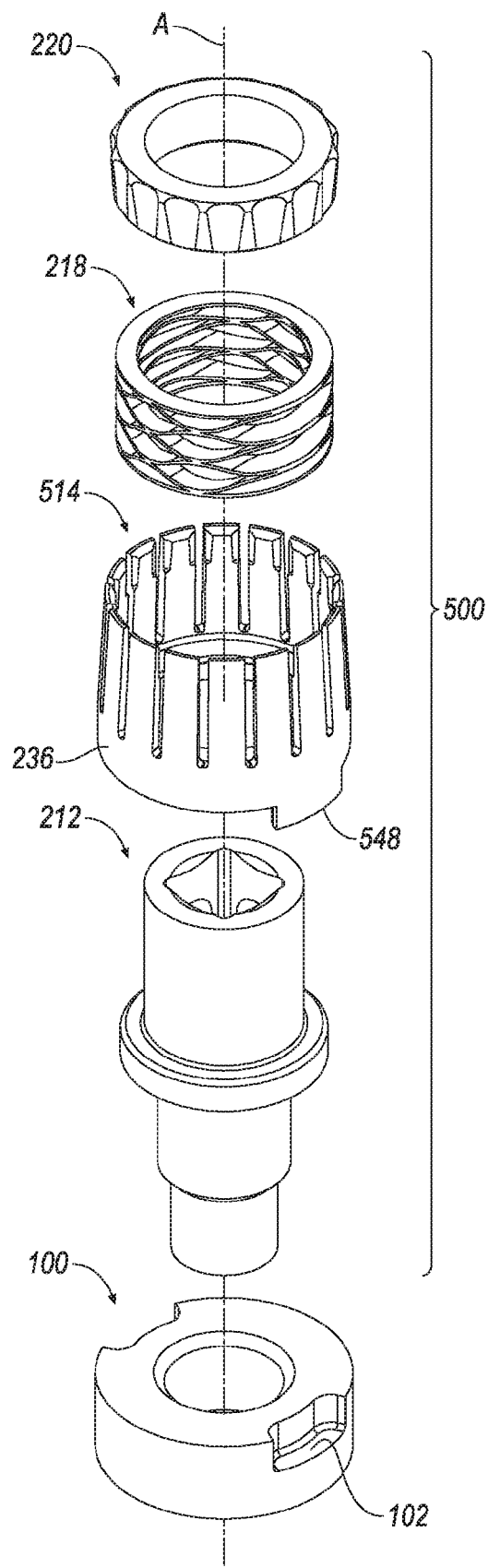
FIG. 19 is an enlarged exploded view of a self-locking plug according to another embodiment of the invention.
Figure 20:
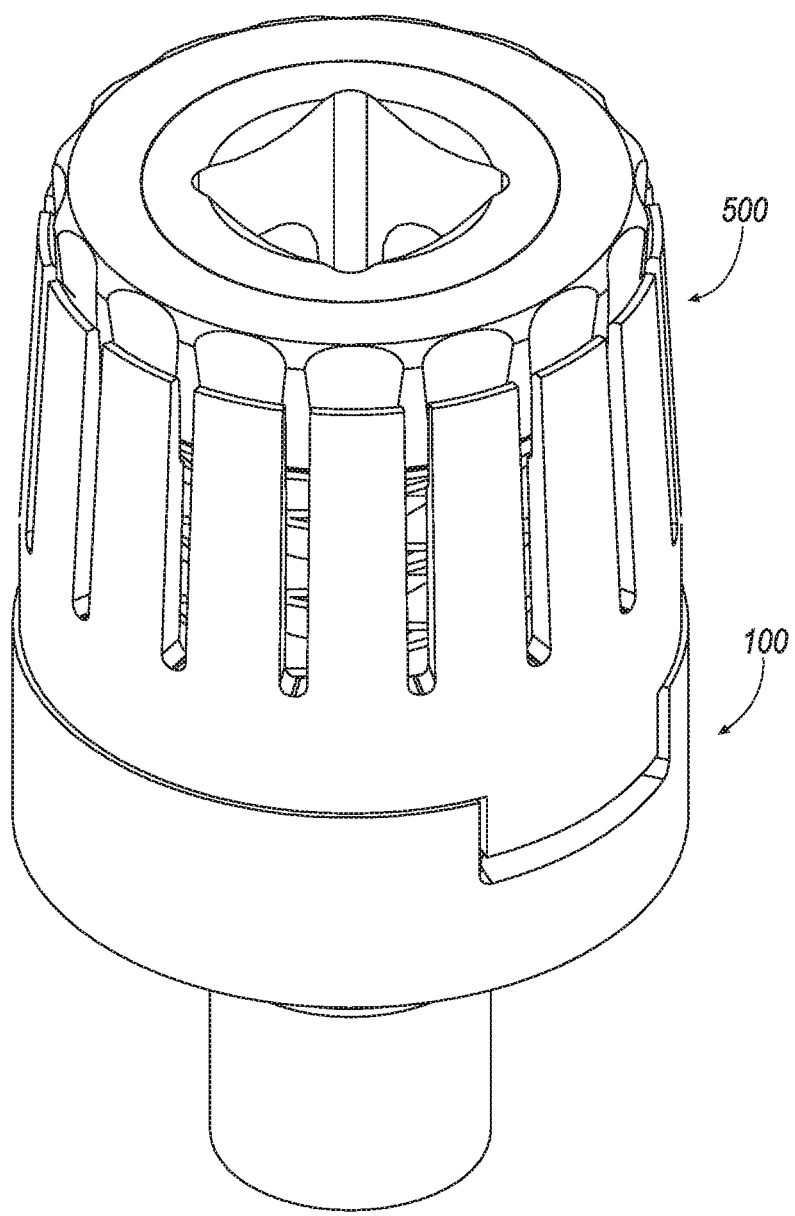
FIG. 20 is an enlarged isometric view of the self-locking plug of FIG. 19 when assembled.

In yet another example shown in FIGS. 19 and 20, the flexible finger beam component 514 of the self-locking plug 500 has one or more tabs 548 that extend axially downward from the solid annular portion 236 (i.e. in an axial direction with respect to the central, longitudinal axis, A, of the self-locking plug 500). In this example, the slot 102 of the borescope port 100 is shaped to interact with the axially downward extending tabs 548 when the self-locking plug 500 is threaded into the borescope port 100.

It will be appreciated that the self-locking plugs 10, 200, 300, 400, 500 of the invention can be used for other applications other than borescope plugs. For example, the self-locking plugs 10, 200, 300, 400, 500 can be used various separable connectors, such as those used in electrical, fluid, hydraulic, and pneumatic lines, mechanical fasteners, such as nuts and bolts, and adjustable linkages in which a jam nut must be prevented from loosening. The self-locking plugs 10, 200, 300, 400, 500 of the invention can also be used as a torque limiting device or clutch in a power train.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A self-locking plug, comprising:
a body component including a flange;
a flexible beam finger component disposed about the body component and including a plurality of axially-oriented flexible beam fingers, and a flange radially inward from the flexible beam fingers;
an annular detent ring component including a plurality of circumferentially-arranged detents separated by ridges in radial alignment with the plurality of flexible beam fingers; and
a biasing component contacting the flange of the flexible beam finger component and the annular detent ring component for providing a biasing force to urge the flexible beam finger component in a direction of a central, longitudinal axis, A, of the self-locking plug,
wherein the plurality of flexible beam fingers travel across the plurality of detents to cause elastic deformation of the flexible beam fingers when the body component is rotated about the central, longitudinal axis, A, of the self-locking plug, and
wherein the flange of the body component contacts the flange of the flexible beam finger component when the self-locking plug is assembled.

2. The self-locking plug according to claim 1, wherein the number of detents is equal to the number of flexible beam fingers.

3. The self-locking plug according to claim 1, wherein the flexible beam finger component further comprises one or more outwardly extending tabs that extend in an axial direction with respect to the central, longitudinal axis, A, of the self-locking plug.

4. The self-locking plug according to claim 1, wherein the flexible beam finger component further comprises one or more outwardly extending tabs that extend in a radial direction with respect to the central, longitudinal axis, A, of the self-locking plug.

5. The self-locking plug according to claim 1, wherein each detent has a generally concave surface and is separated by a substantially planar surface for facilitating interaction with the flexible beam fingers as the plurality of flexible beam fingers travel across the plurality of detents.

6. The self-locking plug according to claim 1, wherein the detents are always in contact with the flexible beam fingers when the flexible beam finger component is rotated relative to the annular detent ring component.

7. The self-locking plug according to claim 1, wherein the flexible beam finger component further comprises one or more outwardly extending tabs, and wherein the one or more outwardly extending tabs of the flexible beam finger component contact a slot formed in a borescope port to prevent rotation of the self-locking plug when the body component rotates about the central, longitudinal axis of the self-locking plug, thereby providing an anti-rotation feature between the flexible beam finger component and the borescope port.

8. The self-locking plug according to claim 1, wherein the flexible beam finger component further comprises one or more outwardly extending tabs, and wherein the one or more outwardly extending tabs of the flexible beam finger component includes a slot that contacts a tab formed in a borescope port to prevent rotation of the self-locking plug when the body component rotates about the central, longitudinal axis of the self-locking plug, thereby providing an anti-rotation feature between the flexible beam finger component and the borescope port.

9. A self-locking plug, comprising:
a body component including a flange;
a flexible beam finger component disposed about the body component and including a plurality of axially-oriented flexible beam fingers, and a flange radially inward from the flexible beam fingers;
an annular detent ring component including a plurality of circumferentially-arranged detents separated by ridges in radial alignment with the plurality of flexible beam fingers; and
a biasing component contacting the flange of the flexible beam finger component and the annular detent ring component for providing a biasing force to urge the flexible beam finger component in a direction of a central, longitudinal axis, A, of the self-locking plug,
wherein the plurality of flexible beam fingers travel across the plurality of detents to cause elastic deformation of the flexible beam fingers when the body component is rotated about the central, longitudinal axis, A, of the self-locking plug, and
wherein the flexible beam finger component contacts a borescope port in such a way so as to prevent rotation of the self-locking plug when the body component rotates about the central, longitudinal axis of the self-locking plug, thereby providing an anti-rotation feature between the flexible beam finger component and the borescope port.

10. The self-locking plug according to claim 9, wherein the number of detents is equal to the number of flexible beam fingers.

11. The self-locking plug according to claim 9, wherein the flexible beam finger component further comprises one or more outwardly extending tabs that extend in an axial direction with respect to the central, longitudinal axis, A, of the self-locking plug.

12. The self-locking plug according to claim 9, wherein the flexible beam finger component further comprises one or more outwardly extending tabs that extend in a radial direction with respect to the central, longitudinal axis, A, of the self-locking plug.

13. The self-locking plug according to claim 9, wherein each detent has a generally concave surface and is separated by a substantially planar surface for facilitating interaction with the flexible beam fingers as the plurality of flexible beam fingers travel across the plurality of detents.

14. The self-locking plug according to claim 9, wherein the detents are always in contact with the flexible beam fingers when the flexible beam finger component is rotated relative to the annular detent ring component.

15. A self-locking plug, comprising:
a body component including a flange;
a flexible beam finger component disposed about the body component and including a plurality of axially-oriented flexible beam fingers, and a flange radially inward from the flexible beam fingers;
an annular detent ring component including a plurality of circumferentially-arranged detents separated by ridges in radial alignment with the plurality of flexible beam fingers; and
a biasing component contacting the flange of the flexible beam finger component and the annular detent ring component for providing a biasing force to urge the flexible beam finger component in a direction of a central, longitudinal axis, A, of the self-locking plug,
wherein the plurality of flexible beam fingers travel across the plurality of detents to cause elastic deformation of the flexible beam fingers when the body component is rotated about the central, longitudinal axis, A, of the self-locking plug, and
wherein the flexible beam finger component contacts a borescope port in such a way as to prevent rotation of the self-locking plug when the body component rotates about the central, longitudinal axis of the self-locking plug, thereby providing an anti-rotation feature between the flexible beam finger component and the borescope port.

16. The self-locking plug according to claim 15, wherein the number of detents is equal to the number of flexible beam fingers.

17. The self-locking plug according to claim 15, wherein the flexible beam finger component further comprises one or more outwardly extending tabs that extend in an axial direction with respect to the central, longitudinal axis, A, of the self-locking plug.

18. The self-locking plug according to claim 15, wherein the flexible beam finger component further comprises one or more outwardly extending tabs that extend in a radial direction with respect to the central, longitudinal axis, A, of the self-locking plug.

19. The self-locking plug according to claim 15, wherein each detent has a generally concave surface and is separated by a substantially planar surface for facilitating interaction with the flexible beam fingers as the plurality of flexible beam fingers travel across the plurality of detents.

20. The self-locking plug according to claim 15, wherein the detents are always in contact with the flexible beam fingers when the flexible beam finger component is rotated relative to the annular detent ring component.

* * * * *